No. 623,339. Patented Apr. 18, 1899.
J. SKIMIN & J. McDANIELD.
COMBINED WAGON AND STOCK AND HAY RACK.
(Application filed Jan. 17, 1899.)
(No Model.) 3 Sheets—Sheet 1.
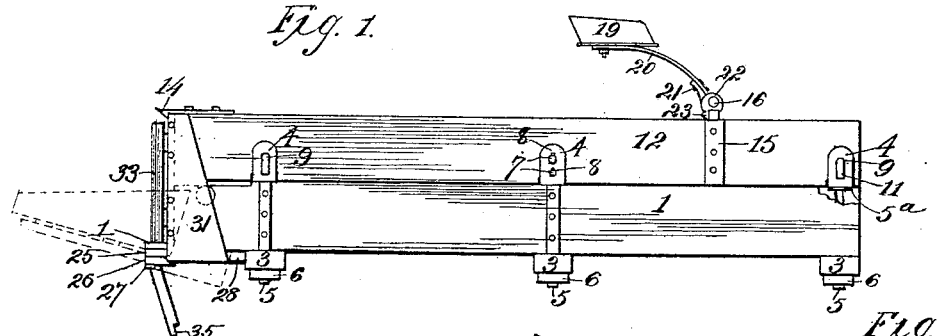
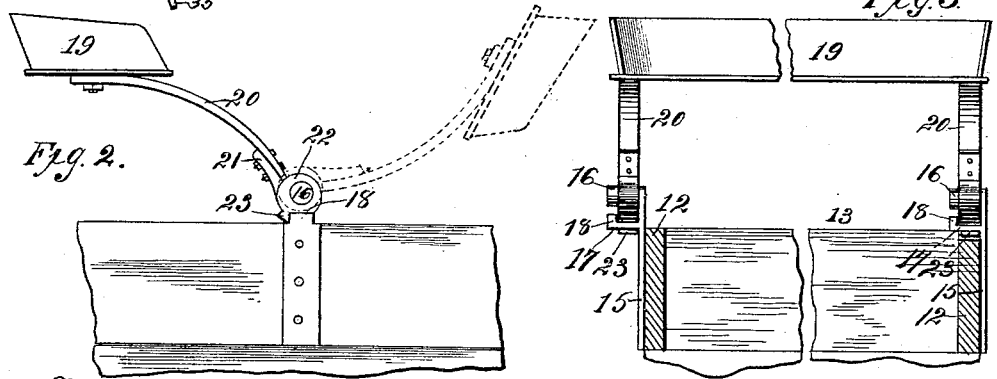
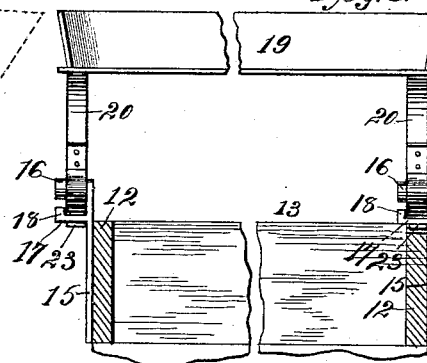
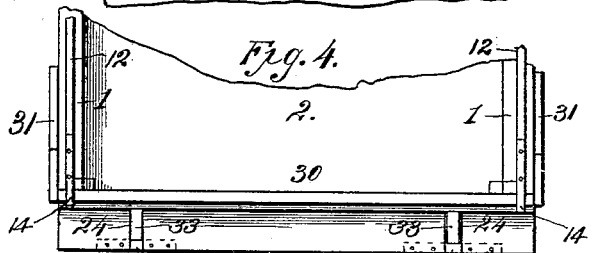
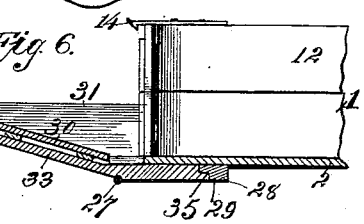
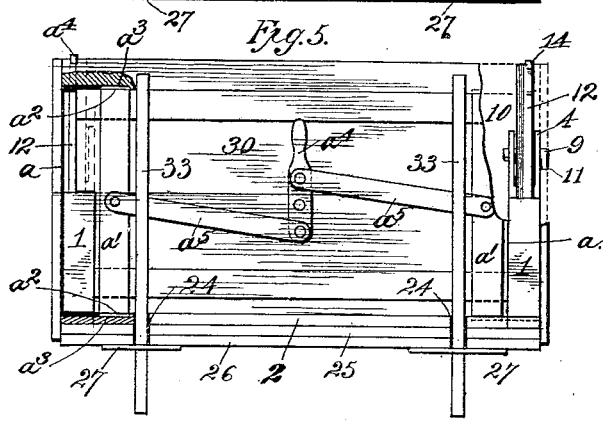
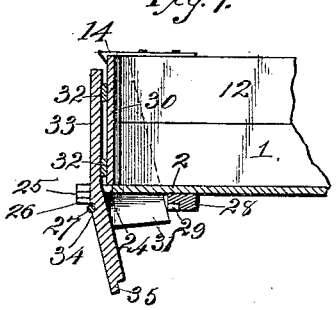
Witnesses:
C. F. Bartholomees
M. R. Remley
Inventors
John Skimin
John McDanield
By Higdon Fischer Thorpe
Attys

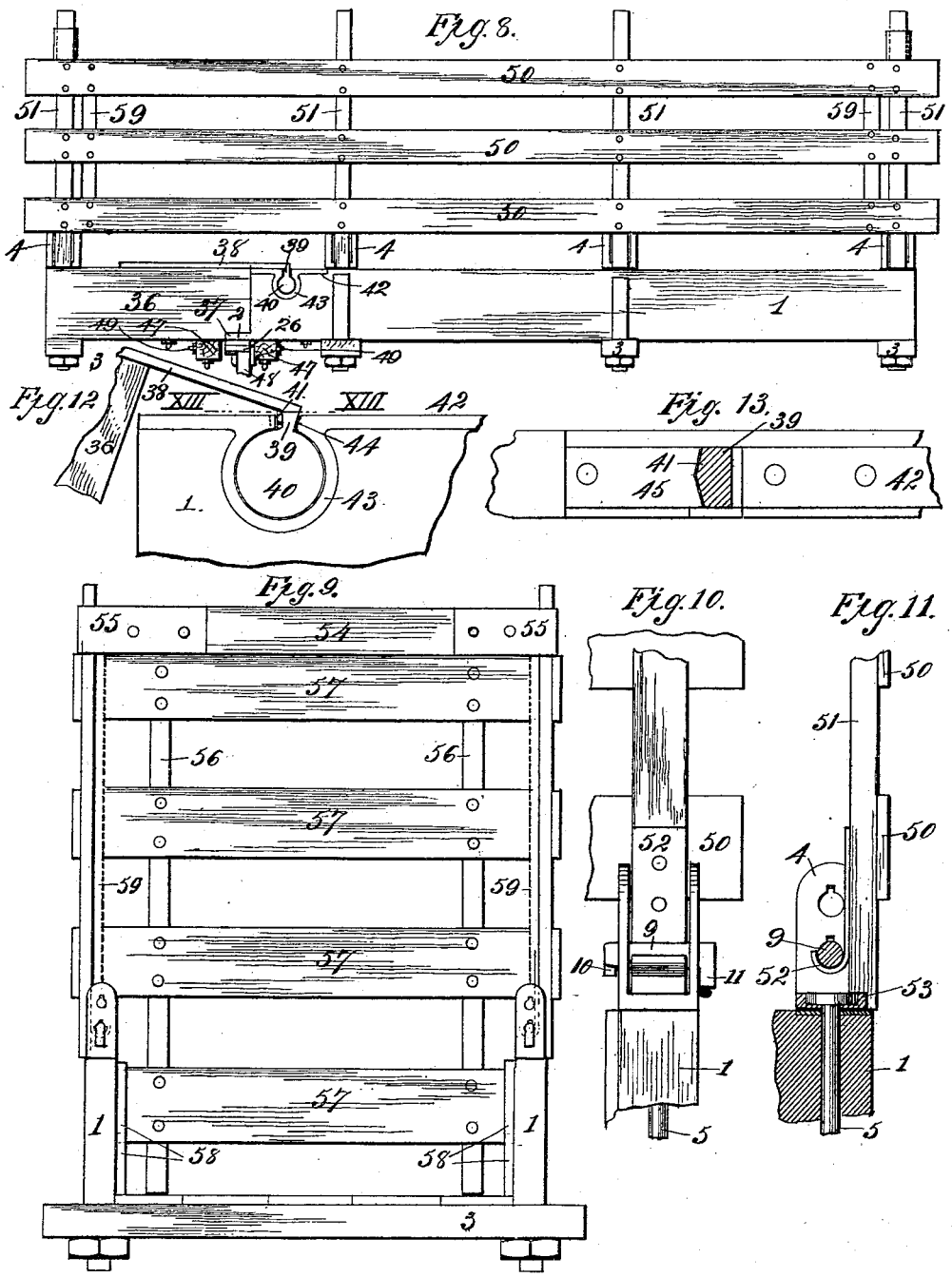

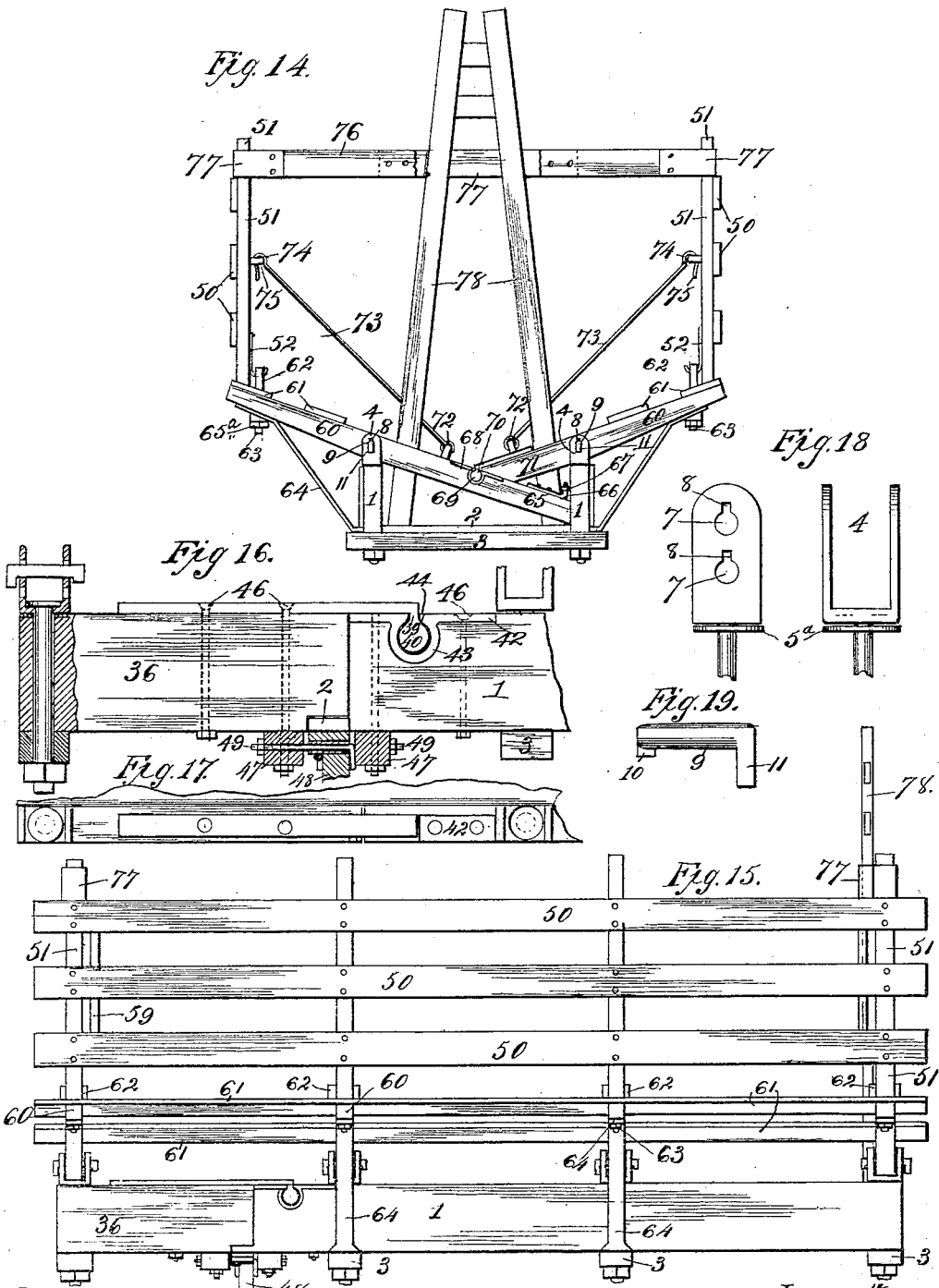

UNITED STATES PATENT OFFICE.

JOHN SKIMIN AND JOHN McDANIELD, OF BONNER SPRINGS, KANSAS.

COMBINED WAGON AND STOCK AND HAY RACK.

SPECIFICATION forming part of Letters Patent No. 623,339, dated April 18, 1899.

Application filed January 17, 1899. Serial No. 702,458. (No model.)

*To all whom it may concern:*

Be it known that we, JOHN SKIMIN and JOHN MCDANIELD, of Bonner Springs, Wyandotte county, Kansas, have invented certain new and useful Improvements in a Combined Wagon and Stock and Hay Rack, of which the following is a specification.

Our invention relates to a combined wagon-body, hog-rack, and hay-rack; and it consists in certain novel and peculiar features of construction and combinations of parts, as will be hereinafter described and claimed, the object in this connection being to produce a device which may be quickly and easily transformed as occasion may demand—that is to say, may be converted at will into either a wagon-body, a hog-rack, or a hay-rack—for the conveyance of grain, vegetables, fruit, or other articles or for the conveyance of stock or hay.

A further object is to produce a device susceptible of the uses above outlined of simple, strong, durable, and comparatively cheap construction, and in order that the invention may be fully understood we will proceed to describe it with reference to the accompanying drawings, in which—

Figure 1 is a side elevation of a wagon-box embodying our invention and provided with an adjustable and removable seat. Fig. 2 is an enlarged view of a part of the wagon in order to disclose clearly the mode of manipulating the seat in order to place it in or remove it from operative position. Fig. 3 is a front view of the wagon to illustrate further the construction of the wagon-seat support. Fig. 4 is a plan view of the rear end of the wagon-box, partly broken away. Fig. 5 is a rear elevation of the same, partly sectioned. Fig. 6 is a longitudinal section of the rear end of the wagon-box with the shoveling-board down. Fig. 7 is a similar view with the shoveling-board up or closing the wagon-box. Fig. 8 is a side elevation of the device when arranged as a hog-rack. Fig. 9 is an end view of the same. Figs. 10 and 11 represent an elevation and a section taken at right angles to the elevation of the couplings for uniting the sides of the rack to the sides of the wagon. Fig. 12 is a view illustrating the construction of the mechanism for splicing an extension onto the wagon-box when the latter is used as a bed for a hog, grain, or hay rack. Fig. 13 is a section taken on the line XIII XIII of Fig. 12. Fig. 14 is a front elevation of the device when arranged as a hay-rack. Fig. 15 is a side elevation of the same. Fig. 16 is a view, partly in side elevation and partly in section, of the rear end of the wagon-box and the spliced extension. Fig. 17 is a plan view of the same. Fig. 18 represents side and edge views of the swivel-brackets mounted upon the wagon-box. Fig. 19 is a side elevation of one of the locking pins or keys for engagement with said brackets and interposed parts.

Referring to the drawings, where similar reference letters and numerals designate like parts in all of the figures, 1 designates the sides, and 2 the bottom, of the wagon-box.

3 designates cross-bars underlying the bottom.

4 designates a series of U-shaped brackets mounted upon the sides 1 and swiveled upon the securing-bolts 5, which extend down through the sides and the cross-bars 3 and are engaged by clamping-nuts 6 at their lower ends. Upon these bolts are collars 5ª, said collars underlying and acting as wear-plates for the swivel-brackets 4. Said brackets are provided, preferably, with the vertical series of openings 7, having offsetting notches 8 at their upper sides, and 9 designates locking pins or keys which are adapted to be fitted through said openings and are provided at their inner ends with laterally-projecting lugs 10 and at their outer ends with arms 11, which project in the same direction as lugs 10. In practice these locking pins or keys when fitted through the brackets and interposed parts hereinbefore described are arranged with said lugs and arms projecting upward, so that the former may pass freely through the communicating notches 8 of the holes 7. When the locking pins or keys are released, the weight of the arms 11 rotates them in said holes until they are pendent from the pins and the lugs 10 are out of alinement with the notches 8. This arrangement insures the non-accidental dislocation of the locking-pins, as will be readily understood. When the device is used as a wagon, these U-shaped brackets 4 are arranged, as shown in Fig. 1, so as to receive the extension sides 12, which increase the depth of the wagon-box, and said extension sides are connected by the end piece 13 in the customary or any preferred manner, and secured to the extension sides at their rear ends are the beveled snap-hooks 14, for a purpose which hereinafter appears.

15 designates brackets which are secured externally to the extension sides 12 at a suitable point and at their upper ends are formed with laterally-projecting trunnions 16 and arms 17, the latter underlying the trunnions and formed at their free ends with the upwardly-projecting flanges 18, the trunnions and companion parts of the brackets projecting in the same direction.

19 designates a wagon-seat mounted as usual on springs 20, and the latter are bolted to arms 21, cast integrally with the eccentrically-pierced collars 22, having stop-lugs 23, projecting from their peripheries at the points of the latter most remote from the axis of the collar. The eccentricity of said collars is so pronounced that when the seat occupies the position shown in dotted lines, Fig. 2, the narrowest portion of the collars is in position to pass freely above the flanges 18 of the brackets 15 as the collars are slipped upon the trunnion 16. When the movement of the collars is arrested by contact with the vertical portions of the brackets, they lie wholly within the flanges 18, and as the seat is thrown back to operative position the collars turn upon the trunnions until finally their movement is arrested by the stop-lug 23 striking against the arms 17. When this happens, portions of the collars of greater extent from their axes to their peripheries than the distance between their axes and the upper edges of flanges 15 lie within said flanges, and consequently prevent the dislocation of the seat by the collars slipping off the trunnions. The seat can only be removed after it has been thrown to approximately the position shown in dotted lines, Fig. 2. This seat construction obviously will be exceedingly convenient, because the seat cannot only be quickly and easily removed or replaced when necessary, but it can be thrown forward without removing it, so as to be entirely out of the way in the loading or unloading of the wagon. When thrown forward, it will rest upon dashboard or front end of the wagon or may be otherwise supported.

The bottom of the wagon projects beyond the rear end of its sides and is provided at suitable points with the longitudinal slots 24. Underlying this projecting portion is a similarly-slotted spacing-strip 25, and beneath that in turn a similarly-slotted strip 26, slots of strips 25 and 26 registering with slots 24, as shown most clearly in Fig. 5. The slots of strip 26 at or near their outer edges are, however, bridged by the underlying metallic strips 27, for a purpose which hereinafter appears, and underlying the bottom of the wagon at a suitable point is a cross-bar 28, formed with notches 29.

A shoveling-board for closing the rear end of the wagon consists of the tail-board proper, 30, having the side wings or flanges 31 to embrace externally the sides of the wagon-box, the lower edge of the tail-board 30 resting squarely upon the extended portion of the bottom 2 at the inner ends of the slots 24 when the wagon is closed, as shown in Fig. 7 most clearly, and when in such position it is held upright by the snap-hooks 14, hereinbefore referred to. In such position the sides of the wagon project rearward through the slots of the tail-board, said slots being closed by slide-plates $a'$ when the shoveling-board is in its recumbent position, as hereinafter referred to, said slide-plates thereby closing openings through which corn or other grain might escape. These slide-plates are formed with tongues $a^2$, fitting in grooves $a^3$ of the tail-board, and are moved by means of a lever $a^4$, mounted on the tail-board and linked to said plates, as at $a^5$.

The tail-board is strengthened by a couple of bars 33, said bars extending down through the slots 24 and the slots registering therewith, as hereinbefore described, (see Figs. 4 to 7, inclusive,) and forward of the cross-strips 27, the bar being provided with notches 34, which fit snugly and pivotally upon said cross-strips. Said bars are of such configuration that when the shoveling-board is open and their lower ends bear against the bottom of the wagon-bed with the projections 35 fitting snugly in the notches 29 of cross-bars 28 the lower edge of the tail-board proper will fit squarely up against the rear edge of the bottom extension and extend at a slight angle upward and rearward therefrom, the said bars 33 forming a bottom for the slots 34 at this time, (see Fig. 6,) so as to prevent grain or other fine product passing through said slots. By this construction it will be apparent that the shoveling-board is free to be raised or lowered at any time and that it can be easily removed when necessary by first causing it to occupy an intermediate position, which will permit it to be lifted slightly, so as to disengage the notches 34 of the cross-bars from the pivot-strips 27. When this is done, it can be withdrawn from position. It can be as easily replaced. The notches 34 of said bars, by engagement with the pivot-strips 27, however, prevent any rearward movement of the shoveling-board and hold the tail-gate portion reliably against the bottom extension when open. The engagement of the tail-gate portion with said bed extension, together with the engagement of the notch with the pivot-strips and the projections 35 with the notches 29, prevents forward movement of the shoveling-board, while lateral movement is guarded against by the engagement of said projections with the notches 29 and the fact that the bars 33 fit snugly in the slots 24 and the flanges 31 embrace externally the sides of the wagon.

As the device is to be used as a hog-rack and as a hay-rack, it is desirable that the body should be of greater length in order to give the capacity usual to hog and hay racks. To accomplish this, we provide an extension 36 for the natural body of the wagon—that is, the body exclusive of the sides 12 and the companion parts—and in order to splice this extension onto the rear end of the wagon in a workmanlike and reliable manner it is constructed as follows—that is to say: It is provided with a notch 37 to enable it to fit snugly against the rear end of the sides 1 and bottom 2 and with brackets 38, forming one member of a coupling of peculiar construction, said brackets projecting forward some distance beyond the front end of the extension 36 and then vertically downward to form the narrow neck 39 and relatively large cylindrical heads 40, the said neck being formed with rearwardly-projecting V-shaped tongues 41. The other member, 42, is secured upon the upper edge of the sides 1 of the wagon-box and at a suitable point with depending collars 43, each having a narrow neck-opening 44, which at its rear side is V-shaped, as shown at 45. These members are secured by bolts 46, which extend down through the sides 1 and sides of the extension 36, (see Fig. 16,) and the contiguous bolts of said members extend through underlying cross-bars 47, employed to strengthen and lend rigidity to the body portion of the device at its weakest point. To secure this extension in position, it is first arranged at about the angle shown in Fig. 12, this being necessary in order that the tongues 41 of the members 38 may be free to enter the neck-openings 44 of members 42, this entrance being effected by moving the body extension laterally until the heads 40 fit snugly in the collars 43. The extension is then permitted to swing down to the position shown in Fig. 8, and in assuming this position it will be noticed that the tongues 41 enter the V-shaped notches 45 (see Fig. 13) and that the extension 36 abuts squarely against the rear end of the sides 1 and bottom 2 and rests upon the latter, the weight of the body extension, however, being sustained by the coupling above described.

When the device is used as a stock and hay rack and the body is thus extended, the rear bolster 48 of the wagon is shifted so that the cross-strip 26 rests upon it and the weakest portions of the splice-couplings—viz., the necks 39 of the bracket members 38—are largely relieved of strain tending to pull the body extension out of position by means of the hook-bolts 49, these hook-bolts extending in opposite directions through the brace-timbers 47 (see Fig. 16) and above the bolster and having their hook ends depending and clasping opposite sides of the bolster. Thus it will be seen that a longitudinal strain causes said hook-bolts to pull against the bolster from opposite directions.

The construction thus far which relates to the body extension and the means for splicing it onto the natural body of the wagon is common in both the hog-rack and the hay-rack. To complete the construction of the former, we employ skeleton side frames consisting of the longitudinal slats 50, bolted to vertically-intersecting bars 51, and secured to the latter near their lower ends are upwardly-disposed hooks 52 for engagement as said bars rest upon the upper edges of the sides of the wagon-body outward of the swivel-brackets 4 with the locking-pins 9, (see Figs. 10 and 11,) said bars 51 being also notched at their lower ends, as at 53, to also rest upon the base portion of said brackets, and consequently resist any tendency of the latter to twist or turn. These skeleton side frames are braced at their upper ends by means of cross-bars 54, provided with loops 55 at their ends, which fit snugly upon the upper ends of the end bars 51 and rest upon the topmost slats 50. The ends of the hog-rack are closed by means of skeleton frames consisting of uprights 56, which rest upon the bottom of the bed and the intersecting cross-slats 57. The undermost cross-slat 57 is short enough to fit between the vertical cleats 58 of the wagon-bed, while those slats 57 above the sides of the wagon-bed fit between the cleats 59, secured vertically to the inner sides of the skeleton side frames, hereinbefore described, and the adjacent end bars 51, the latter thus serving as guide-cleats for the end frames.

When the device is used as a hay-rack, the end frames, consisting of the bars 56 and slats 57, are dispensed with, and the side frames, composed of slats 50 and bars 51, are mounted upon the outer ends of a pair of inclined frames, which project laterally some distance beyond the sides of the body. These frames consist of the transverse parallel bars 60, which at their inner ends fit in the U-shaped brackets 4 and are secured thereto by the locking pins or keys 9, (see Figs. 14 and 15,) and the longitudinal slats 61, the latter connecting said bars at their upper sides, and from the outermost of said slats project upward the loops 62, provided with stems 63, extending down through said slats, the bars 60, and the upper ends of metallic angle-braces 64, and embraced by clamping-nuts 65ª, the lower ends of said angle-braces being bolted or otherwise secured to the cross-bars 3, underlying the wagon-bed. The endmost bars 60 of one of said inclined frames are provided with inclined extensions 65, which extend obliquely across the end of the wagon and bear against the opposite side adjacent to the bottom and are provided with upwardly-disposed hooks 66, engaging eyebolts 67, projecting inward from said side. By this construction any strain upon the rack of which said parts form a part is distributed throughout the entire body. Secured in recesses in the upper sides of said extensions 65 are brackets 68, provided with collars 69, having neck-openings in order that the headed brackets 70 may be engaged with said collars, this engagement being accomplished by slipping the former laterally into the latter, said brackets 70 being secured to the inner ends of extensions 71 of the endmost bars 60 of the inclined frame at the opposite side. This coupling may, if desired, be of precisely the same construction and require precisely the same manipulation to cause its engagement or disengagement as the splice-coupling composed of brackets 38 and 42, hereinbefore described; but it is not necessary, owing to the fact that the said bars are prevented from moving laterally by their position in said U-shaped brackets, as will be readily understood.

Pivotally connected, as at 72 or otherwise, to the extension 65 71 of the rear end bars of the inclined frames are brace-rods 73, terminating at their upper ends in hooks 74 for engagement with loops or eyebolts 75, projecting inward from the endmost bars 51 of the skeleton frames hereinbefore described, said frames resting upon the outermost slats of the inclined frames, with their hooks 52 engaging the loops or eyebolts 62.

76 designates cross-bars provided with loops 77 at their ends adapted to fit upon the upper ends of bars 51 and rest upon the topmost slats 50 to brace the upper ends of said side frames, and the brace-bar 76 at the front end of the head-rack is provided with a loop or clip 77 (see Figs. 14 and 15) to receive the vertical frame 78, resting upon the bottom of the wagon and secured at its lower end in any suitable or preferred manner.

From the description of the construction of the device and the mode of assembling its parts the method of dismantling it and transforming it to adapt it to a new use will be readily understood, as these operations are simply the reverse of those already described, and it is to be understood that while the description and drawings illustrate the preferred embodiment of our invention we reserve the right to make such changes in its detail construction, form, proportion, and arrangement of parts as will not be a departure from its spirit and scope.

Having thus described the invention, what we claim as new, and desire to secure by Letters Patent, is—

1. A shoveling-board or end-gate for wagons, comprising a slotted extension projecting rearward from the bottom of the wagon, a pivot-strip underlying each slot of said extension, a shoveling-board comprising a tail-gate portion provided with vertical slots to receive the rear ends of the sides of the wagon-body, and side flanges to externally embrace the said sides of the wagon, and bars secured to the rear side of the tail-gate portion and extending through the slots of said extension and pivoted to said strips, substantially as described.

2. A shoveling-board or end-gate for wagons, comprising a slotted extension projecting rearward from the bottom of the wagon, a pivot-strip underlying each slot of said extension, a shoveling-board, comprising a tail-gate portion provided with vertical slots to receive the rear ends of the sides of the wagon-body, and side flanges to externally embrace the said sides of the wagon, bars secured to the rear side of the tail-gate portion and extending through the slots of said extension and pivoted to said strips, slide-bars carried by the tail-gate portion, and means to move said bars outwardly and cover the slots of the tail-gate portion, when the shoveling-board is down, substantially as described.

3. A shoveling-board or end-gate for wagons, comprising a slotted extension projecting rearward from the bottom of the wagon, a pivot-strip underlying each slot of said extension, a shoveling-board comprising a slotted tail-gate portion and side flanges, bars secured to the rear side of the tail-gate portion and extending through the slots of said extension and provided with notches pivotally engaging said pivot-strips and terminating in projections, a cross-bar secured to the bed of the wagon and provided with notches to receive the projections of said bars when the shoveling-board is down, means to secure the shoveling-board in its upright or closed position, slide-bars secured to the shoveling-board and means to adjust said bars inward or outward so as to uncover or cover the slots of the shoveling-board, substantially as described.

4. In a device of the character described, a wagon-body having brackets secured in the upper edges of its sides, said brackets each embodying a cylindrical collar having a neck-opening, and a body extension for said wagon-body provided with brackets having cylindrical head portions to fit within said collars, and neck portions to fit in the neck-openings of said collars, substantially as described.

5. In a device of the character described, a wagon-body having brackets secured in the upper edges of its sides, said brackets each embodying a cylindrical collar having a neck-opening and a V-shaped notch communicating with said neck-opening, and a body extension for said wagon-body provided with brackets having cylindrical head portions to fit within said collars and neck portions to fit in the neck-openings of said collars; said neck portions being formed with V-shaped tongues to engage the said V-shaped notches when the body extension occupies its operative position with relation to the wagon-body, substantially as described.

6. In a device of the character described, a wagon-body, a wagon-body extension fitting against the rear end of the wagon-body, coupling devices uniting them together above the bottom or bed of the wagon, a pair of cross-bars secured to the bottom of the wagon at opposite sides of the joint between the body and the body extension, a wagon-bolster supporting said connected parts between said cross-bars, and hook-bolts extending through said cross-bars and clasping opposite sides of the bolster, substantially as described.

7. In a device of the character described, a wagon-body, brackets swiveled thereon and provided with holes having offsetting notches at their upper sides, and locking pins or keys extending through said brackets and provided with handles at one end and lugs at the other, said lugs being adapted to be alined with said notches in order to place said locking pins or keys in or remove them from position, substantially as described.

8. In a device of the character described, a wagon-body, U-shaped brackets thereon, skeleton frames mounted vertically upon the sides of the wagon and upon and within said brackets, and provided with upwardly-disposed hooks, locking pins or keys extending through said brackets and engaged by said hooks, cross-bars provided with loops at their ends engaging the upper ends of said vertical frames, cleats secured to the inner sides of the skeleton side frames, and vertical end frames fitting in said cleats and resting upon the bottom of the wagon, substantially as described.

9. In a device of the character described, a wagon-body, U-shaped brackets mounted thereon, inclined frames extending outward and upward from said brackets and secured thereto, extensions for the end bars of said frames, the extensions of one set of end bars bearing against the opposite side of the wagon, and the extensions of the other resting upon and coupled to the extensions of the companion frame, vertical side frames mounted upon the outer ends of the inclined frames, and cross-bars connecting the upper ends of said frames, substantially as described.

10. In a device of the character described, a wagon-body, U-shaped brackets mounted thereon, inclined frames extending outward and upward from said brackets and secured thereto, extensions for the end bars of said frames, the extensions of one set of end bars bearing against the opposite side of the wagon, and the extensions of the other resting upon and coupled to the extensions of the companion frame, vertical side frames mounted upon the outer ends of the inclined frames, cross-bars connecting the upper ends of said frames, angle-braces connecting the outer parts of said inclined frames to the wagon-body, eyebolts projecting from the upright side frames, a vertical frame resting upon the wagon-bed and guided through the front cross-bar connecting said side frames, and rods pivoted to the said coupled extensions and hooked to said eyebolts, substantially as described.

11. In a device of the character described, a wagon-body, U-shaped brackets mounted thereon, inclined frames extending outward and upward from said brackets and secured thereto, extensions for the end bars of said frames, the extensions of one set of end bars extending across the wagon-body and bearing against the opposite side near the bottom and hooked to said side, and provided about midway the width of the wagon with cylindrical collars having neck-openings, the extensions of the end bars of the companion inclined frame resting at their inner ends upon the first-named extensions, and provided with headed brackets which are adapted to be slid laterally into or out of engagement with the said cylindrical collars, substantially as described.

In testimony whereof we affix our signatures in the presence of two witnesses.

JOHN SKIMIN.
JOHN McDANIELD.

Witnesses:
M. R. REMLEY,
F. S. THRASHER.